United States Patent [19]
Kimura

[11] Patent Number: 5,886,467
[45] Date of Patent: Mar. 23, 1999

[54] PLASMA ADDRESSED LIQUID CRYSTAL DISPLAY DEVICE

[75] Inventor: Kazuto Kimura, Kanagawa, Japan

[73] Assignee: Sony Corporation, Tokyo, Japan

[21] Appl. No.: 932,340

[22] Filed: Sep. 17, 1997

Related U.S. Application Data

[63] Continuation of Ser. No. 566,173, Dec. 1, 1995, abandoned.

[30] Foreign Application Priority Data

Dec. 2, 1994 [JP] Japan ................... 6-329446

[51] Int. Cl.⁶ ............... H01J 9/16; H01J 17/04
[52] U.S. Cl. .............. 313/582; 313/584; 313/586; 345/60
[58] Field of Search .................. 313/582, 484, 313/491, 493, 584, 586, 587; 445/25, 43; 345/60, 37

[56] References Cited

U.S. PATENT DOCUMENTS

| | | | |
|---|---|---|---|
| 4,526,818 | 7/1985 | Hoshikawa et al. | 156/221 |
| 5,207,607 | 5/1993 | Nagano et al. | 313/582 |
| 5,351,144 | 9/1994 | Tanamachi | 313/484 |
| 5,428,263 | 6/1995 | Nagano | 313/484 |

FOREIGN PATENT DOCUMENTS

| | | | |
|---|---|---|---|
| 0 597 432 | 5/1994 | European Pat. Off. . | |
| 0 597 432 A1 | 5/1994 | European Pat. Off. | G02F 1/133 |
| 42 23 304 | 4/1993 | Germany . | |
| 42 11 258 | 5/1993 | Germany . | |
| 43 06 305 | 11/1993 | Germany . | |
| 42 39 149 | 12/1993 | Germany . | |

*Primary Examiner*—Ashok Patel
*Attorney, Agent, or Firm*—Hill & Simpson

[57] ABSTRACT

A plasma addressed liquid crystal display device having a flat panel structure where a liquid crystal cell is superposed on a plasma cell. The liquid crystal cell includes a front substrate with data electrodes arranged in columns, an intermediate substrate bonded to the front substrate via a predetermined gap, and a liquid crystal filled in the gap. The plasma cell includes a rear substrate joined to the intermediate substrate via a predetermined space, and discharge channels formed in the space and arranged in rows. The intermediate substrate is dimensionally so set as to include an overlapping planar region of the front substrate and the rear substrate which are different in shape from each other. Further a plurality of barrier ribs for prescribing the space dimension in the plasma cell are existent between the intermediate and rear substrates over the planar region.

9 Claims, 3 Drawing Sheets

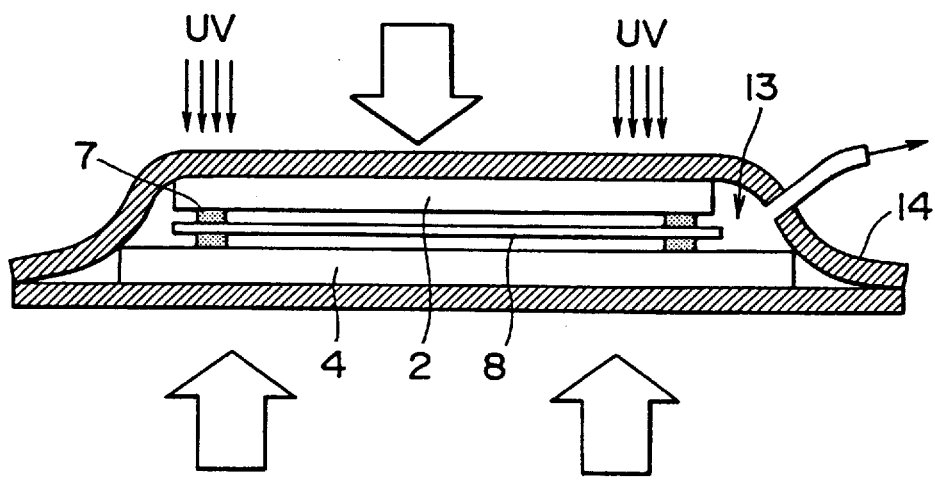
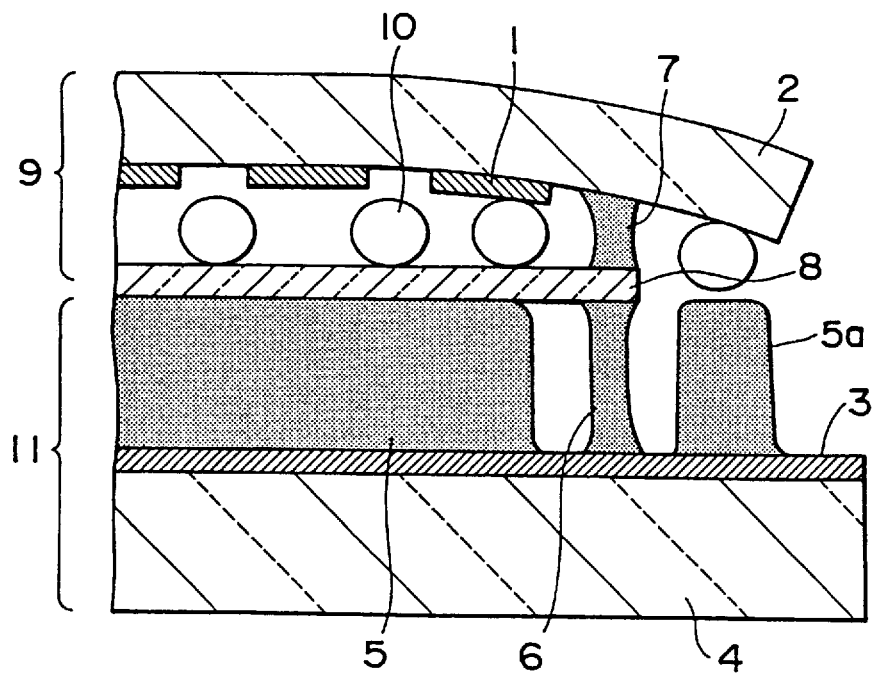

PLASMA ADDRESSED LIQUID CRYSTAL DISPLAY DEVICE

This is a continuation of application Ser. No. 08/566,173, filed Dec. 1, 1995 now abandoned.

BACKGROUND OF THE INVENTION

1. Field of the Invention

The present invention relates to a plasma addressed liquid crystal display device having a flat panel structure where a liquid crystal cell is superposed on a plasma cell, and more particularly to the shape of an intermediate substrate (microsheet) disposed between a liquid crystal cell and a plasma cell for separating them from each other. Further the invention relates also to a processing technique adopted in assembling a liquid crystal cell on a plasma cell.

2. Description of the Related Art

There is known a plasma addressed display device where a plasma cell is utilized for addressing a liquid crystal cell, as disclosed for example in Japanese Patent Laid-open No. Hei 4-265931 which corresponds to U.S. patent application Ser. No. 07/837,961 for an Electro Optical Device, filed by Shigeki Miyazaki on Feb. 20, 1992. As shown in FIG. 4, the above plasma addressed display device has a flat panel structure comprising a liquid crystal cell 101, a plasma cell 102 and a common intermediate substrate 103 interposed therebetween. The intermediate substrate 103 is composed of an extremely thin glass sheet or the like and is termed a microsheet. The plasma cell 102 consists of a rear substrate 104 joined to the intermediate substrate 103, and an ionizable gas is contained hermetically in a space defined therebetween. Striped discharge electrodes 105 are formed on an inner surface of the rear substrate 104. Since the discharge electrodes 105 can be produced through print baking on the flat rear substrate 104 by a screen printing process or the like, it is possible to attain superior productivity and workability with another advantage of adequacy for miniaturization. Barrier ribs 106 are formed on the discharge electrodes 105 to divide the space where the ionizable gas is hermetically contained, thereby constituting discharge channels 107. The barrier ribs 106 can also be baked by a screen printing process, and the respective tops thereof abut on one surface of the intermediate substrate 103. The striped discharge electrodes 105 function as anodes A and cathodes K alternately to generate plasma discharge therebetween. The intermediate substrate 103 and the rear substrate 104 are joined to each other by the use of glass frit 108 or the like.

Meanwhile the liquid crystal cell 101 is composed of a transparent front substrate 109. The front substrate 109 is bonded to the other surface of the intermediate substrate 103 with a predetermined gap retained therebetween by the use of a sealant 110 or the like, and the gap is filled with a liquid crystal 111. Data electrodes 112 are formed on the inner surface of the front substrate 109 in a manner to be orthogonal to the striped discharge electrodes 105. And matrix pixels are prescribed at the intersections of the data electrodes 112 and the discharge channels 107.

In the plasma addressed display device of the structure mentioned above, display driving is performed by line-sequentially switching and scanning the row discharge channels 107 where plasma discharges are generated and simultaneously applying, in synchronism with the scanning, picture signals to the column data electrodes 112 on the side of the liquid crystal cell 101. Upon generation of plasma discharges in the discharge channels 107, the inside is turned to the anode potential substantially uniformly, and the pixels are selected per row. That is, each discharge channel functions as a sampling switch. When a picture signal is applied to each pixel in a conducting state of the plasma sampling switch, the sampled pixel can be turn on or off under control. And even after the plasma sampling switch is turned to its non-conducting state, the picture signal is still held in the related pixel.

The intermediate substrate 103, which physically separates the liquid crystal cell 101 and the plasma cell 102 from each other, has an extremely small thickness of 50 $\mu$m or so for electrically coupling the two cells. Therefore the intermediate substrate 103 is termed a microsheet. The front substrate 109 is bonded onto such microsheet through the sealant 110 with a gap retained therebetween, and the gap is filled with the liquid crystal 111 and hermetically sealed to constitute the liquid crystal cell 101. This gap has a further smaller dimension of 5 $\mu$m or so. And for the purpose of ensuring a stable superior picture quality on the display, it is requisite to achieve uniform dimensional control of the gap over the entire display area. However, it has been difficult heretofore to realize satisfactory uniform control of the gap dimension.

SUMMARY OF THE INVENTION

It is an object of the present invention to provide an improved plasma addressed liquid crystal display device wherein the gap dimension in a liquid crystal cell is rendered uniform by modifying the shape of an intermediate substrate.

Another object of the present invention resides in preventing breakage of the intermediate substrate in view of the conventional disadvantage that, since the intermediate substrate is composed of an extremely thin glass microsheet, it is frequently prone to being cracked or broken in a step of assembling the liquid crystal cell.

According to one aspect of the present invention, there is provided a plasma addressed liquid crystal display device having a flat panel structure where a liquid crystal cell is superposed on a plasma cell. The liquid crystal cell includes a front substrate with data electrodes arranged in columns, an intermediate substrate bonded to the front substrate via a predetermined gap, and a liquid crystal filled in the gap. The plasma cell includes a rear substrate joined to the intermediate substrate via a predetermined space, and discharge channels formed in the space and arranged in rows. The requisites of the invention reside in that the area of the intermediate substrate is dimensionally so set that the overlapping planar region of the front substrate and the rear substrate of mutually different external shapes is included in the intermediate substrate. And spacer particles for prescribing the gap dimension in the liquid crystal cell are existent between the intermediate and front substrates over the planar region. Further a plurality of barrier ribs for prescribing the space dimensions in the plasma cell are existent between the intermediate and rear substrates over the planar region.

According to another aspect of the present invention, there is provided a method of manufacturing a plasma addressed liquid crystal display device having the above construction. The method includes a first step of assembling a plasma cell by joining a rear substrate, where row discharge electrodes and barrier ribs are previously formed, to one surface of an intermediate substrate having a predetermined area; a second step of assembling a flat panel structure by disposing a front substrate, where column data electrodes are previously formed, opposite to the other surface of the intermediate substrate, and superposing the mutually opposite substrates with spacer particles and a sealant interposed therebetween; a third step of inserting the flat panel structure into a gastight enclosure, then vacuuming the enclosure and, while applying an atmospheric pressure uniformly to the flat panel structure from above and below, hardening the sealant in this state to thereby bond the front substrate and the intermediate substrate to each other; and a fourth step of producing a liquid crystal cell by injecting a liquid crystal into the gap prescribed by the spacer particles between the front and intermediate substrates.

In the present invention, the screen of the plasma addressed liquid crystal display device is composed of the overlapping planar region of the front substrate and the rear substrate having mutually different shapes. The area of the intermediate substrate disposed between the front and rear substrates is dimensionally so set as to include the planar region. Preferably, the area of the intermediate substrate is dimensionally so set as to match to the planar region substantially. And the spacer particles are existent between the intermediate and front substrates over the planar region, and also the barrier ribs are existent between the intermediate and rear substrates over the planar region. Due to the above structure, it becomes possible to attain uniform dimensional control of the gap between the intermediate and front substrates over the entire effective screen of the display device. Furthermore, in the step of assembling the liquid crystal cell by bonding the front substrate to the intermediate substrate, the flat panel structure is inserted into a gastight enclosure and, after evacuation thereof, the atmospheric pressure is applied thereto uniformly from above and below, and the sealant is hardened by irradiation of ultraviolet rays or the like. Consequently, uniform application of the pressure from the ambience to the front and rear substrates can be achieved to thereby prevent breakage of the intermediate substrate while rendering the gap dimension uniform.

The above and other features and advantages of the present invention will become apparent from the following description which will be given with reference to the illustrative accompanying drawings.

BRIEF DESCRIPTION OF THE DRAWINGS

FIG. 2 is a process diagram illustrating an essential step in a method for manufacture of the plasma addressed liquid crystal display device of the present invention;

FIG. 3 is a partial sectional view showing a reference example of a plasma addressed liquid crystal display device.

DESCRIPTION OF THE PREFERRED EMBODIMENTS

Figure 1A:
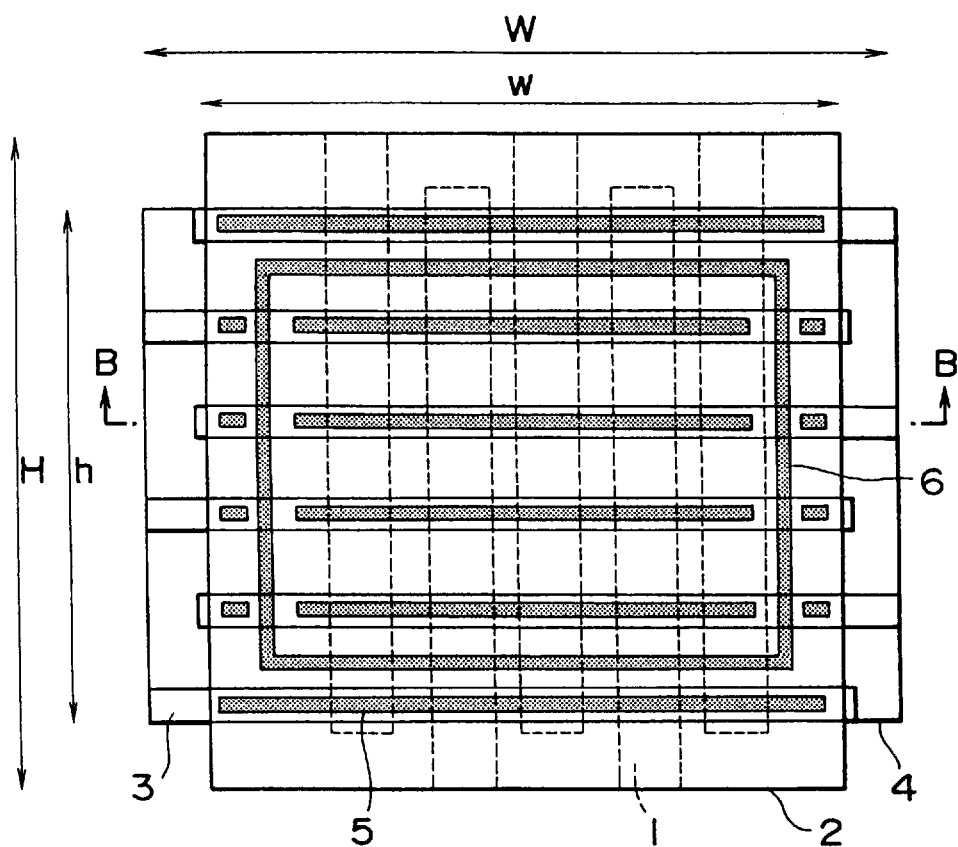
FIGS. 1A and 1B are a plan view and a sectional view, respectively, of an embodiment representing the plasma addressed liquid crystal display device of the present invention.
Figure 1B:
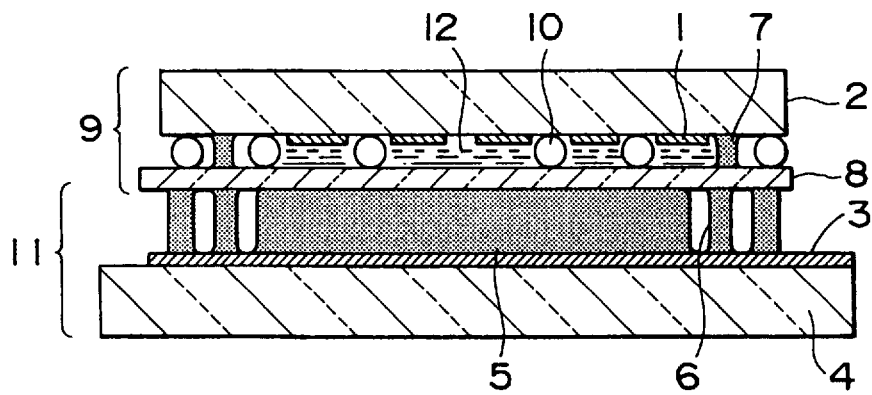
Figure 4:
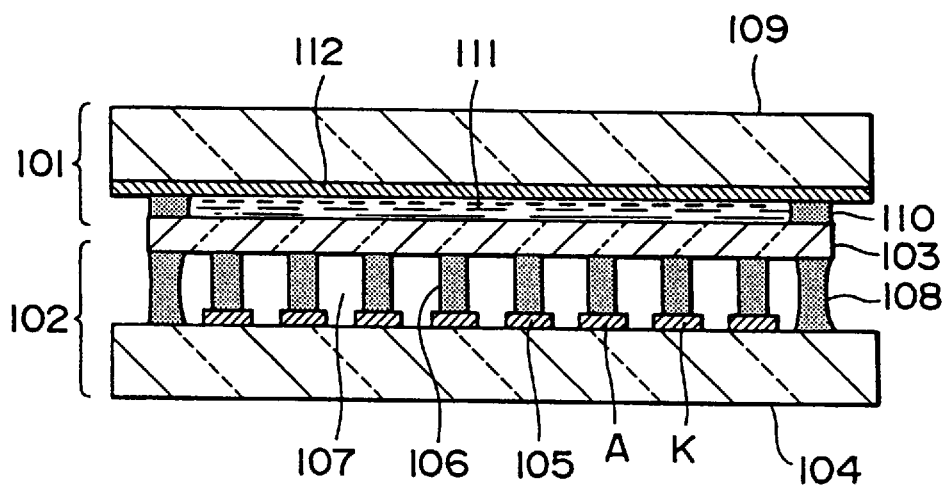
FIG. 4 is a sectional view showing a general construction of a conventional plasma addressed liquid crystal display device in the prior art.

Hereinafter preferred embodiments of the present invention will be described in detail with reference to the accompanying drawings. FIGS. 1A and 1B are a plan view and a sectional view each showing an exemplary construction of the plasma addressed liquid crystal display device of the present invention. This display device has a flat panel structure where a liquid crystal cell is superposed on a plasma cell. As shown in FIG. 1A, the liquid crystal cell consists of a front substrate 2 of glass or the like where data electrodes 1 are arranged in columns. The front substrate 2 is bonded to an intermediate substrate with a predetermined gap retained therebetween. The intermediate substrate is composed of an extremely thin glass sheet or the like. The gap defined between the front substrate 2 and the intermediate substrate is filled with a liquid crystal. The data electrodes 1 are extended alternately up to both ends of the front substrate 2 so as to be electrically connected to external circuits. Meanwhile the plasma cell consists of a rear substrate 4 where discharge electrodes 3 are arranged in rows. The rear substrate 4 is also composed of a glass sheet or the like. And similarly the discharge electrodes 3 are extended alternately up to both left and right ends of the rear substrate 4 so as to be electrically connected to external circuits. Barrier ribs 5 are formed in a manner to match to the discharge elecrtrodes 3 respectively. The rear substrate 4 is joined to the intermediate substrate via a predetermined space by the use of glass frit 6. In this case, the respective top portions of the barrier ribs 5 abut on the rear surface of the intermediate substrate, so that the space is divided into stripes to thereby prescribe discharge channels. And at both left and right ends of each barrier rib 5, notches are formed as regions to be coated with the glass frits 6.

For the purpose of connection to external circuits, it is necessary that the data electrodes 1 and the discharge electrodes 3 be exposed from the ends of the relevant substrates respectively, and therefore the front substrate 2 and the rear substrate 4 are shaped to be different from each other to meet the above requirement. One of the requisites of the present invention is that the area of the intermediate substrate is dimensionally so set as to include the overlapping planar region of the front substrate 2 and the rear substrate 4 which are mutually different in shape. However, if the area of the intermediate substrate is excessively large, there may arise some impediment to connection of the electrodes to external circuits. It is therefore preferred that the area be matched substantially to the overlapping planar region. In a concrete example, specific dimensions are so set that the plasma addressed liquid crystal display device has a height (H) of 250 mm and a width (W) of 300 mm, while the overlapping planar region of the front substrate 2 and the rear substrate 4 has a height (h) of 230 mm and a width (w) of 270 mm.

FIG. 1B is a sectional view showing the structure of the plasma addressed liquid crystal display device taken along the line B—B in FIG. 1A. As shown, the front substrate 2 is bonded onto the upper surface of the intermediate substrate 8 via a sealant 7 to thereby constitute the aforementioned liquid crystal cell 9. Between the intermediate substrate 8 and the front substrate 2, spacer particles 10 for dimensionally prescribing the gap in the liquid cell 9 are existent over the planar region described above. Meanwhile the rear substrate 4 is joined to the lower surface of the intermediate substrate 8 via the glass frit 6 to thereby constitute the aforementioned plasma cell 11. Between the intermediate substrate 8 and the rear substrate 4, a plurality of barrier ribs 5 for dimensionally prescribing the space in the plasma cell 11 are existent over the planar region, so that the intermediate substrate 8 is supported uniformly by the spacer particles 10 and the barrier ribs 5 from above and below. Since the gap in the liquid cell 9 is dimensionally determined merely by the size of the spacer particles 10, a uniform thickness of the liquid crystal cell can be ensured over the entire planar region by hardening the sealant 7 while applying a uniform load in this state. The sealant 7 may be composed of ultraviolet-setting resin for example. Exemplary dimensions of the individual component members are such that each of the spacer particles 10 has a diameter of 5.0 µm, the intermediate substrate 8 of a thin glass sheet has a thickness of 50 µm, each of the barrier ribs 5 has a height of 200 µm or so, and the front substrate 2 has a thickness of 1.1 mm.

Referring now to FIG. 1B continuously, a detailed description will be given on a method for manufacture of the plasma addressed liquid crystal display device of the invention. First a plasma cell 11 is assembled by joining a rear substrate 4, where row discharge electrodes 3 and barrier ribs 5 are formed previously, to one surface of an intermediate substrate 8 having a predetermined area. Glass frit 6 is used for joining the two substrates to each other. Thereafter a front substrate 2, where column data electrodes 1 are formed previously, is disposed opposite to the other surface of the intermediate substrate 8, and a flat panel structure is assembled by superposing these two substrates mutually in a state where spacer particles 10 and an ultraviolet-setting sealant 7 are interposed therebetween. Subsequently the flat panel structure is inserted into a gastight enclosure and, by evacuation of such enclosure, a uniform atmospheric pressure is applied to the flat panel structure from above and below. Then ultraviolet rays are irradiated in this state to harden the sealant 7 to thereby bond the front substrate 2 and the intermediate substrate 8 to each other. And finally a liquid crystal 12 is injected into the gap prescribed by the spacer particles 10 between the front substrate 2 and the intermediate substrate 8 to consequently produce a liquid crystal cell.

FIG. 2 typically illustrates a liquid crystal assembling step which is essential in the manufacturing method of the present invention. As illustrated, a flat panel 13 is inserted into a gastight enclosure 14, which is then evacuated so that a uniform load is applied to the flat panel from above and below. In this state, ultraviolet rays (UV) are irradiated to harden the sealant 7, thereby bonding the front substrate 2 and the intermediate substrate 8 to each other. According to the experimental result, the thickness of the liquid crystal cell including the periphery of the panel 13 was rendered uniform as 5.0±0.1 µm. It is generally necessary for the characteristics of a liquid crystal cell to ensure a precision of ±10.1 µm, and the manufacturing method of the invention is capable of completely achieving the desired precision. The gastight enclosure 14 may be composed of a film or the like, and a preferred material thereof is polyethylene for example. Since polyethylene is sufficiently adequate for transmitting ultraviolet rays therethrough, it becomes possible to execute the process of hardening the sealant 7 while keeping the flat panel 13 inserted in the gastight enclosure 14.

Instead of the above-described vacuum pressure means using a gastight enclosure, there may be contrived another means which positions a flat panel 13 on a surface table and applies pressure thereto by placing a weight from above to join the front substrate 2 to the intermediate substrate 8. However, in the case of a plasma addressed liquid crystal display device where discharge electrodes and barrier ribs 5 are baked previously on the rear substrate 4 by a screen printing process, some warps and undulations are caused on the rear substrate 4 during the baking process by the difference between the thermal expansion coefficients and so forth. Consequently, if a weight is placed from above in the state where the flat panel is positioned on a surface table, there may occur a fault that many cracks or flaws are induced in the glass. In contrast therewith, the vacuum pressure means adopted in the present invention is free from causing any crack or the like in the glass material of the substrate, since the flat panel 13 is inserted in the flexible gastight enclosure 14 and a uniform atmospheric pressure is applied thereto from an ambience.

FIG. 3 is a partial sectional view typically showing a reference example of a plasma addressed liquid crystal display device. For the purpose of making this example better understood, any component elements corresponding to those in the plasma addressed liquid crystal display device of the present invention shown in FIG. 1B are denoted by like reference numerals. In this example, the area of an intermediate substrate 8 is dimensionally smaller than an overlapping planar region of a front substrate 2 and a rear substrate 4. In this construction, there is a disadvantage that when the front substrate 2 is bonded to the intermediate substrate 8, a pressure is applied to an end portion of the front substrate 2 to consequently cause deformation of the end portion. And if a sealant 7 is hardened in this state, some strain is left as illustrated to eventually fail in attaining a dimensionally uniform gap in a liquid crystal cell 9. In this reference example, the gap dimension is varied considerably in a range of 5.0±1.0 µm or so. In case the intermediate substrate 8 is positioned inside the end portion of the front substrate 2, the end portion of the front substrate 2 is not supported uniformly by dummy barrier ribs 5a positioned in the outermost portion of the rear substrate 4, so that the deformation and strain mentioned are left there.

According to the present invention, as described hereinabove, the area of an intermediate substrate is dimensionally so set as to include an overlapping planar region of a front substrate and a rear substrate which are different in shape from each other. Spacer particles are existent between the intermediate substrate and the front substrate over the planar region, and barrier ribs are existent between the intermediate substrate and the rear substrate similarly over the planar region. Due to such a structure, the gap dimension in the liquid crystal cell can be controlled uniformly without inducing breakage of the intermediate substrate. Further according to the present invention, a flat panel is inserted into a gastight enclosure, and a sealant is hardened after evacuation of the gastight enclosure and application of a uniform atmospheric pressure to the flat panel from above and below. Consequently, it becomes possible to ensure a uniform gap dimension in the liquid crystal cell while preventing breakage of the intermediate substrate.

Although the present invention has been explained with reference to the preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A plasma addressed liquid crystal display device, comprising:

a front substrate of a sufficiently thin material to flex;

a rear substrate different in dimensions in a major plane from said front substrate and disposed in parallel thereto to define an overlapping planar area and a non-overlapping area, said rear substrate having a first edge portion extending beyond said overlapping planar area and said front substrate having a second edge portion extending beyond said overlapping planar area at a position different from said first edge portion;

an intermediate substrate having an area at least as great as said overlapping planar area of said front and rear substrates, said intermediate substrate being spaced by a liquid crystal gap from said front substrate, said intermediate substrate being spaced by a gas discharge gap from said rear substrate, said intermediate substrate extending between said front and rear substrates over an entirety of said overlapping planar area so that said intermediate substrate extends under said front substrate at all of said overlapping planar area to prevent flexing of said front substrate;

a plurality of data electrodes arranged in parallel to each other on said front substrate;

a plurality of discharge electrodes consisting of anode electrodes and cathode electrodes arranged in parallel to each other and perpendicular to the data electrodes on said rear substrate;

a liquid crystal layer provided between said front and intermediate substrates; and an ionizable gas contained between said intermediate and rear substrates.

2. A plasma addressed liquid crystal display device as recited in claim 1, further comprising:

a plurality of barrier ribs provided between said intermediate and rear substrates.

3. A plasma addressed liquid crystal display device as recited in claim 1, further comprising a plurality of spacer particles provided on said liquid crystal layer.

4. A plasma addressed liquid crystal display device as claimed in claim 1, wherein said front substrate and said rear substrate are substantially rectangular, and wherein said first edge portion includes two opposite edges of said rectangular rear substrate extending beyond opposite sides of said front substrate at two sides, and wherein said second edge portion includes two opposite edges of said rectangular front substrate extending beyond opposite sides of said rear substrate at two sides lying perpendicular to said two sides of said front substrate.

5. A plasma addressed liquid crystal display device as claimed in claim 1, wherein said intermediate substrate extends only to an extent of said overlapping planar area.

6. A plasma addressed liquid crystal display device as claimed in claim 1, wherein said intermediate substrate extends beyond an extent of said overlapping planar area.

7. A plasma addressed liquid crystal display device, comprising:

a front substrate of a rectangular shape having predetermined dimensions in a major plane;

a rear substrate of a rectangular shape and having dimensions in a major plane that are different from said predetermined dimensions of said front substrate, said rear substrate being disposed in parallel to said front substrate to define an overlapping planar area and a non-overlapping area, said rear substrate having a first edge portion extending beyond said overlapping planar area and said front substrate having a second edge portion extending beyond said overlapping planar area at a position different from said first edge portion;

an intermediate substrate having an area at least as great as said overlapping planar area of said front and rear substrates, said intermediate substrate extending between said front and rear substrates substantially over an entirety of said overlapping planar area;

a seal enclosing a discharge area between said rear substrate and said intermediate substrate;

a plurality of data electrodes arranged in parallel to each other on said front substrate, said data electrodes extending to said second edge portion of said front substrate for connection outside said overlapping planar area;

a plurality of discharge electrodes consisting of anode electrodes and cathode electrodes arranged in parallel to each other and perpendicular to the data electrodes, said discharge electrodes being on said rear substrate and extending to said first edge portion of said rear substrate for connection outside said overlapping planar area;

a plurality of ribs extending between said rear substrate and said intermediate substrate and extending parallel to said discharge electrodes to define discharge channels each having an anode electrode and a cathode electrode, said ribs including dummy rib portions outside said discharge area defined by said seal;

a liquid crystal layer provided between said front and intermediate substrates; and an ionizable gas contained in said discharge area between said intermediate and rear substrates.

8. A plasma addressed liquid crystal display device comprising:

a front substrate;

a rear substrate different in dimensions in a major plane from said front substrate and disposed in parallel thereto to define an overlapping planar area and a non-overlapping area, said rear substrate having a first edge portion extending beyond said overlapping planar area and said front substrate having a second edge portion extending beyond said overlapping planar area at a position different from said first edge portion;

an intermediate substrate having an area at least as great as said overlapping planar area of said front and rear substrates, said intermediate substrate extending between said front and rear substrates over an entirety of said overlapping planar area;

a plurality of data electrodes arranged in parallel to each other on said front substrate;

a plurality of discharge electrodes consisting of anode electrodes and cathode electrodes arranged in parallel to each other and perpendicular to the data electrodes on said rear substrate;

a liquid crystal layer provided between said front and intermediate substrates;

an ionizable gas contained between said intermediate and rear substrates, a plurality of barrier ribs provided between said intermediate and rear substrates;

a seal enclosing said ionizable gate in a discharge area, and ones of said barrier ribs being dummy ribs extending between said intermediate substrate and said rear substrate outside said discharge area sealed by said seal.

9. A plasma addressed liquid crystal display device, comprising:

a front substrate of a rectangular shape having predetermined dimensions in a major plane;

a rear substrate of a rectangular shape and having dimensions in a major plane that are different from said predetermined dimensions of said front substrate, said rear substrate being disposed in parallel to said front substrate to define an overlapping planar area and a non-overlapping area, said rear substrate having a first edge portion extending beyond said overlapping planar area and said front substrate having a second edge portion extending beyond said overlapping planar area at a position different from said first edge portion;

an intermediate substrate having an area at least as great as said overlapping planar area of said front and rear substrates, said intermediate substrate extending between said front and rear substrates over an entirety of said overlapping planar area;

a seal enclosing a discharge area between said rear substrate and said intermediate substrate;

a plurality of data electrodes arranged in parallel to each other on said front substrate, said data electrodes extending to said second edge portion of said front substrate for connection outside said overlapping planar area;

a plurality of discharge electrodes consisting of anode electrodes and cathode electrodes arranged in parallel to each other and perpendicular to the data electrodes, said discharge electrodes being on said rear substrate and extending to said first edge portion of said rear substrate for connection outside said overlapping planar area;

a plurality of ribs extending between said rear substrate and said intermediate substrate and extending parallel to said discharge electrodes to define discharge channels each having an anode electrode and a cathode electrode said ribs including dummy rib portions outside said discharge area defined by said seal;

a liquid crystal layer provided between said front and intermediate substrates; and an ionizable gas contained in said discharge area between said intermediate and rear substrates, wherein said first and second edge portions extend beyond said overlapping planar area in mutually perpendicular directions.

* * * * *